US006763597B2

United States Patent
Lysen

(10) Patent No.: US 6,763,597 B2
(45) Date of Patent: Jul. 20, 2004

(54) ARRANGEMENT AND PROCESS FOR DETERMINING THE RELATIVE ALIGNMENT OF TWO BODIES

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 10/365,692

(22) Filed: Feb. 13, 2003

(65) Prior Publication Data

US 2004/0093747 A1 May 20, 2004

(30) Foreign Application Priority Data

Feb. 14, 2002 (DE) .......................................... 102 06 162

(51) Int. Cl.[7] .............................................. G01B 11/27
(52) U.S. Cl. ..................... 33/286; 33/227; 33/DIG. 21; 33/412; 356/153
(58) Field of Search .......................... 33/227, 228, 263, 33/275 R, 285, 286, DIG. 21, 412, 529, 645, 203, 533; 356/153

(56) References Cited

U.S. PATENT DOCUMENTS

| | | | | |
|---|---|---|---|---|
| 3,901,604 A | * | 8/1975 | Butler | 33/286 |
| 4,249,294 A | * | 2/1981 | Belfiore | 33/645 |
| 4,698,491 A | * | 10/1987 | Lysen | 356/400 |
| 4,709,485 A | * | 12/1987 | Bowman | 33/228 |
| 5,531,030 A | * | 7/1996 | Dale, Jr. | 33/203 |
| 5,987,762 A | * | 11/1999 | Toth et al. | 33/286 |
| 6,098,297 A | * | 8/2000 | Belfiore | 33/286 |
| 6,374,507 B1 | * | 4/2002 | Lehto | 33/645 |
| 6,434,841 B1 | * | 8/2002 | Stahl et al. | 33/286 |
| 2003/0051354 A1 | | 3/2003 | Segerstrom et al. | |

* cited by examiner

Primary Examiner—Christopher W. Fulton
Assistant Examiner—Madeline Gonzalez
(74) Attorney, Agent, or Firm—Nixon Peabody LLP; David S. Safran

(57) ABSTRACT

A arrangement for determining the alignment of marked axes (22, 28, 36, 38, 48, 50) of a first (20, 30, 40) and a second body (26, 32, 42) relative to one another, which is provided with a first and a second measurement device (10, 12) which can be attached to the first body or to the second body in a fixed spatial relation to the respective marked axis, the first measurement device (10) having a first source (L2) for delivering a light beam and a second (D1) and a third optoelectronic sensor (D3), and the second measurement device (12) having a second (L1) and a third source (L3) for a light beam and a first optoelectronic sensor (D2), the optoelectronic sensors being made such that they can determine the impact point of a light beam on the sensor, and the first light source being assigned to the first sensor and the second and the third light source being assigned to the second and third sensor.

15 Claims, 2 Drawing Sheets

ARRANGEMENT AND PROCESS FOR DETERMINING THE RELATIVE ALIGNMENT OF TWO BODIES

BACKGROUND OF THE INVENTION

1. Field of the Invention

This invention relates to an arrangement and a process for determining the alignment of marked axes of a first and a second body, for example two rollers, shafts or pulleys.

2. Description of Related Art

WO 01/50082A1 and corresponding published U.S. patent application Ser. No. 2000/005134A1 disclose a device and a process for determining the alignment of two pulleys relative to one another. To do so, there are two measurement means which correspond to one another and which each can be attached to the running surface of one of the two pulleys. Each measurement means comprises a laser light source which delivers a fan-shaped laser beam, which lies in a plane which is parallel to the end face of the respective pulley. On either side of each laser light source, there is a respective light sensor, the laser light source and the two light sensors each lying on one line. When the axes of rotation of the pulleys are parallel to one another and the pulleys do not have any parallel offset, the laser light fan delivered by the opposing measurement means runs through the two light sensors. Correct alignment of the two pulleys relative to one another will be recognized using the corresponding signals of two sensors of the two measurement means at a time. Furthermore, the use of the system for determining the alignment of two rollers relative to one another is also described.

The disadvantage, in this system is the poor accuracy with respect to determining twisting of the shaft axes or pulley axles relative to one another, i.e., skewing of the two axles relative to one another can only be ascertained with relatively poor accuracy.

SUMMARY OF THE INVENTION

The object of this invention is to devise an arrangement and a process for determining the alignment of the marked axes of two bodies relative to one another, and determination of the skew of the marked axes will be enabled with relative accuracy.

This object is achieved in accordance with the invention by an arrangement for determining the alignment of marked axes of a first and a second body relative to one another, with a first and a second measurement means which can be attached to the first body or to the second body in a fixed spatial relation to the respective marked axis, the first measurement means having a first light source for delivering a light beam and a second and a third optoelectronic sensor, and the second measurement means having a second and a third light source for a light beam and a first optoelectronic sensor, the optoelectronic sensors being made such that they can determine the impact point of a light beam on the sensor, and the first light source being assigned to the first sensor and the second and the third light source being assigned to the second and third sensor.

This object is also achieved in accordance with the invention by a process for determining the alignment of the alignment of marked axes of a first and a second body relative to one another, in which a first and a second measurement means are attached to the first body and to the second body in a fixed relation to the respective marked axis, a first light beam is delivered by the first measurement means by means of a first light source to a first optoelectronic sensor provided on the second measurement means, and a second and a third light beam are delivered by the second measurement means, by means of a second and third light source, to a second and third optoelectronic sensor provided on the first measurement means, the impact point of the assigned light beam on the sensor surface being determined by the optoelectronic sensors, and the relative alignment of the two measurement means being computed from the determined impact points of the first, second and third light beam.

In the approach in accordance with the invention, it is advantageous that skewing of the marked axes of the two bodies relative to one another can be determined with relative accuracy.

The invention is explained in detail below by way of example using the accompanying drawings.

DETAILED DESCRIPTION OF THE INVENTION

Figure 1:
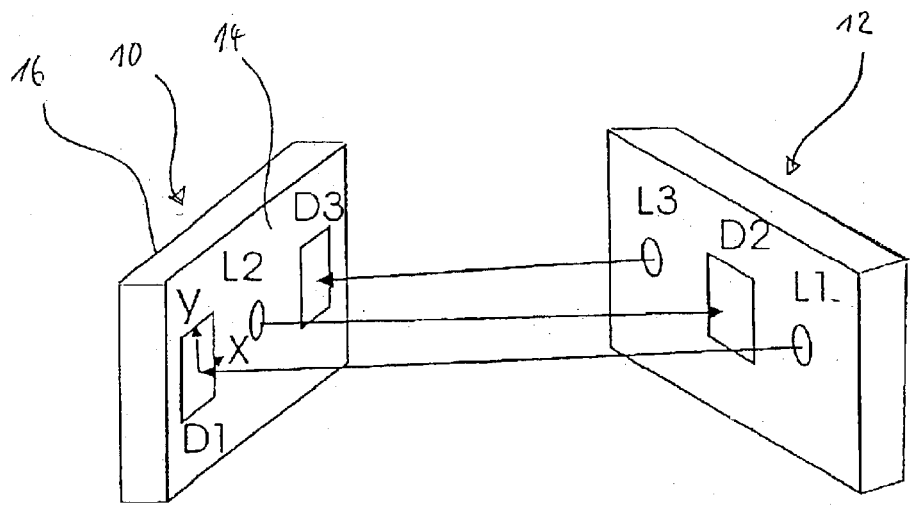
FIG. 1 schematically shows a perspective view of an arrangement for determining the alignment of two bodies relative to one another, including the emitted light beams.

FIG. 1 schematically shows one example for an arrangement in accordance with the invention for determining the alignment of two bodies relative to one another, which comprises a first measurement means 10 and a corresponding second measurement 12 which interacts with it. The first measurement means 10 comprises a laser light source L2 and two optoelectronic sensors D1 and D3, the laser light source L2 being located in the middle between the two sensors D1 and D3. The sensors D1 and D3 and the laser light source L2 are located on the front 14 of the measurement means 10 roughly on a straight line. The sensors D1 and D3 on the front 14 of the measurement means 10 have a planar sensor surface and are made such that they can detect the impact point of the light beam or light spot on the sensor surface, for example, the x and y coordinates of the impact point are determined and are output as the sensor signal (the y axis and the x axis of the sensor surface of the sensor D1 are shown schematically in FIG. 1, the x axis running in the horizontal direction and the y axis in the vertical direction), i.e. the sensors D1, D2 and D3 being duo-lateral detectors. The sensor surfaces of the sensors D1 and D3 lie in the same plane.

The laser light source L2 is made such that it emits an essentially collimated, i.e., nondivergent, laser beam which is perpendicular to the plane of the sensor surfaces of the sensors D1 and D3.

The back 16 of the measurement means 10 is provided with a device (not shown), by means of which the measurement means 10 can be securely attached in a suitable manner to the body which is to be measured, as is explained in detail below.

The second measurement means 12 is made as a corresponding counterpart to the measurement means 10 and has two laser light sources L1 and L3 and a light sensor D2 which is located in the middle between the two laser light sources on a straight line with them. The laser light sources L1 and L3 and the sensor D2 are made analogously to the laser light source L2 and the sensors D1 and D3. The laser beams emitted by the light sources L1 and L3 are parallel to one another and are perpendicular to the sensor surface of the sensor D2.

The arrangement of the light sources L1, L2, and L3 and the sensors D1, D2, D3 is chosen such that, if the two measurement means 10 and 12 are arranged exactly opposite one another and parallel to one another, the laser beam which is delivered by the light source L1 strikes the surface of the sensor D1 exactly in the middle, the laser beam of the light source L2 strikes the sensor D2 in the middle and the laser beam of the light source L3 strikes the sensor D3 in the middle. In this case the laser beams of the light sources L1, L2 and L3 are parallel to one another and lie in the same plane which is horizontal according to FIG. 1.

The relative alignment of the two measurement means 10 and 12 is computed using the impact points of the laser beams of the light sources L1, L2, and L3, which points are determined by the detectors D1, D2, and D3, by means of suitable electronics (not shown).

Figure 2:
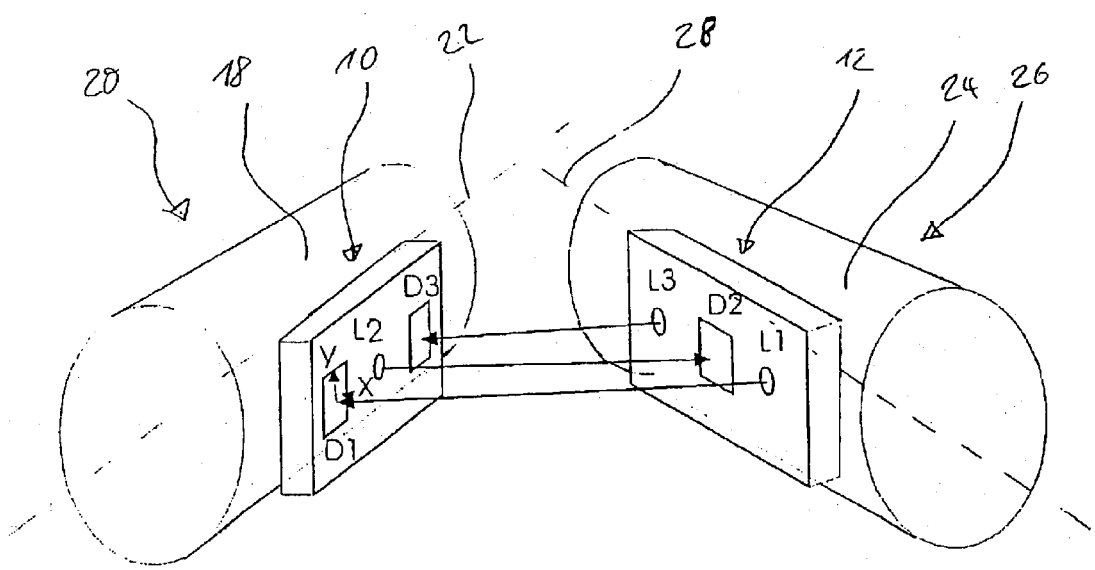
FIG. 2 schematically shows the use of the arrangement from FIG. 1 for determining the alignment of two rollers, FIG. 3 schematically shows the use of the arrangement from FIG. 1 for determining the alignment of two coupled shafts to one another.

FIG. 2 shows by way of example one application for the measurement arrangement shown in FIG. 1, the measurement means 10 with its back 16 being mounted by form-fit on the outside peripheral surface 18 of the roller 20. Here, the plane of the sensor surfaces of the sensors D1 and D3 runs tangentially to the peripheral surface 18 of the roller 20. The line on which the sensors D1 and D3 and the light source L2 lie runs parallel to the lengthwise axes 22 of the rollers.

The second measurement means 12 is mounted analogously on the outside peripheral surface 24 of a second roller 26 which is located essentially parallel to the first roller 20, i.e. the roller axes 22 and 28 run essentially parallel. In this example, the measurement means 10 and 12 are used to ascertain whether, and optionally which, deviation from an exactly parallel alignment of the roller axes 22 and 28 is present.

Before the start of the actual measurement, the two measurement means 10 and 12 are shifted on the peripheral surface 18 and 24 such that the laser beam of the light source L2, as much as possible, strikes the center of the sensor surface of the sensor D2, i.e., the deviation of the impact point from the coordinate origin of the sensor surface of the sensor D2 should be as small as possible. Then, the actual measurement is taken, i.e., the determination of the impact points of the laser beams of the light sources L1 and L3 on the sensor surface of the sensors D1 and D3. In the evaluation, the measurement results of all three sensors D1, D2 and D3 are considered. An exactly parallel alignment of the roller axes 22 and 28 is present when either all three laser beams hit the center of the respective detector surface or if, in general, the determined y-coordinate of the sensors D1 and D3 is the same, and furthermore, the x-cordinate of the sensors D1, D2 and D3 is the same (rotation around the axes 22, 28 or a displacement along the axes 22, 28 has no effect on the parallelism; a corresponding deviation in the calibration of the two measurement means 10 and 12 relative to one another is thus automatically corrected; thus, it is not necessary for the laser beam of the light source L2 to hit exactly the center of the detector surface of the detector D2).

Deviations from the exact parallelism of the axes 22 and 28, specifically a skewed and/or divergent arrangement of the axes 22 and 28 relative to one another, lead to a corresponding torsion or tilting of the measurement means 10 and 12 relative to one another so that the lines on which the sensors D1, D3 and the light source L2 as well as the sensor D2 and the light sources L1, L2 lie are no longer parallel to one another; this leads to corresponding "asymmetrical" impact coordinates of the laser beams, from which the position deviations can be quantitatively determined.

Figure 3:
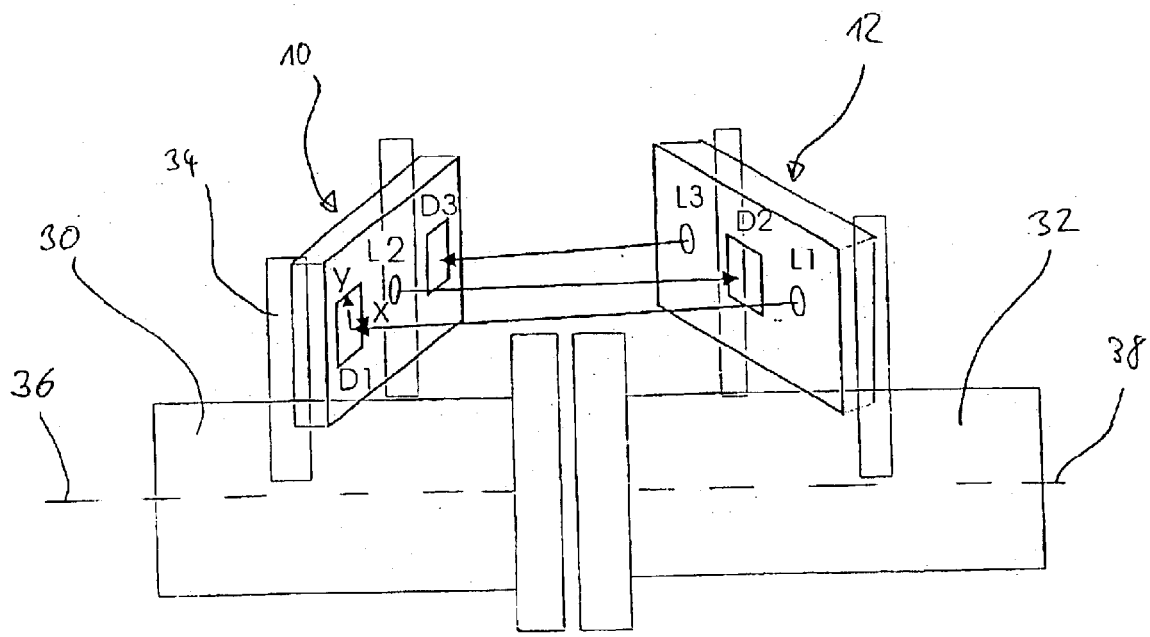

FIG. 3 shows one application in which the measurement means 10 and 12 are used for checking the flush alignment of the axes of rotation 36 and 38 of the two coupled shafts 30 and 32. Here, the measurement means 10 and 12 are mounted by means of the corresponding schematically shown fasteners 34 by form-fit on the outside periphery of the corresponding shaft 30 and 32; in contrast to the example from FIG. 2, the planes of the sensor surfaces of the sensors D1, D2, and D3 are not tangential, but perpendicular to the outside peripheral surfaces of the shafts 30 and 32.

Based on the different geometrical arrangement, compared to the embodiment as shown in FIG. 2, here, other criteria apply to the evaluation of the measurement results. Thus, for example, in the embodiment as shown in FIG. 3, displacement in the y direction between the two measurement means 10 and 12 is an indication of parallel offset of the two shaft axes, conversely relative skewing between the two measurement means 10 and 12 around the axis of the light beams of the light source L2 or the axis parallel to it is acceptable, since this is only an indication of inexact initial calibration of the measurement means 10 and 12.

Figure 4:
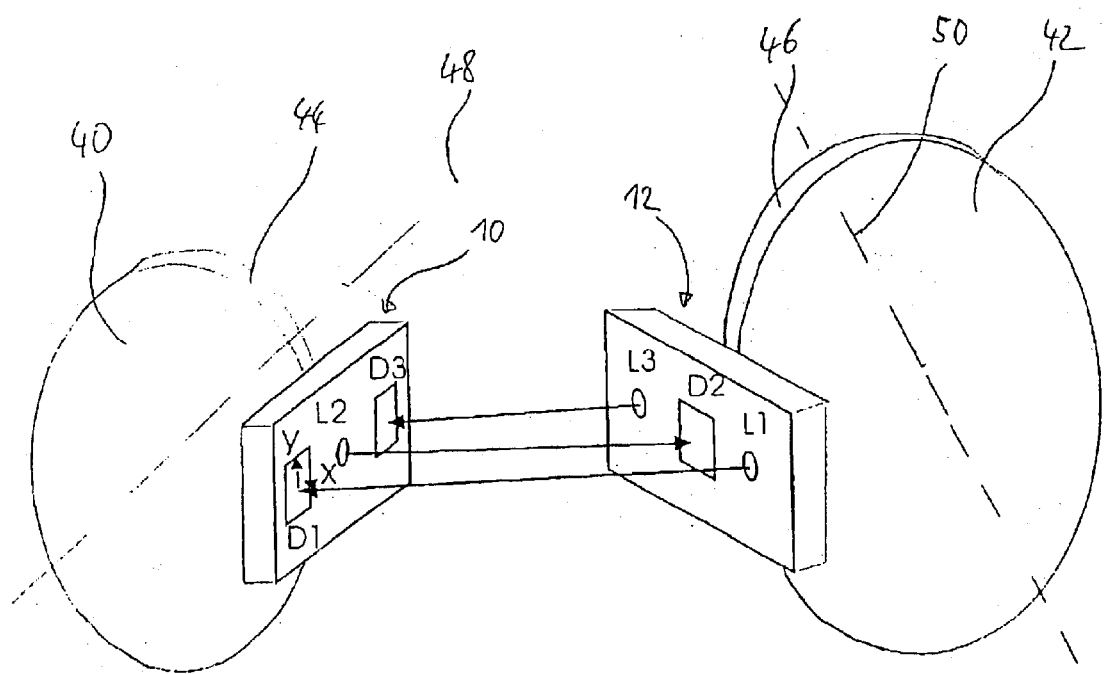
FIG. 4 shows the use of the arrangement from FIG. 1 for determining the alignment of two pulleys.

FIG. 4 shows another application of the measurement arrangement, it being used to check the alignment of two pulleys 40 and 42 relative to one another. Here, the measurement means 10 and 12 are each mounted on the outside periphery or the running surface 44 and 46 of the pulley 40 and 42, the type of attachment corresponding geometrically to that from FIG. 2, i.e., the sensor surfaces are tangential to the peripheral surface 44 and 46. For detecting the parallelism of the axes 48 and 50 of rotation of the pulleys 40, 42, thus, the same criteria apply as in the embodiment as shown in FIG. 2. However, in the embodiment as shown in FIG. 4, in addition, the determination of the parallel offset between the pulleys 40 and 42 is of interest, since the pulleys should lie in the same plane for optimum transfer of force and to minimize the wear. Accordingly, the type of attachment of the measurement means 10 and 12 to the pulleys 40, 42 is selected such that displacement along the axes 48 and 50 of rotation is not possible (for example, by fixing in the belt groove).

According to the described embodiments, the measurement arrangement from FIG. 1 can be used as a roller alignment device, a shaft alignment device and a belt alignment device by providing the corresponding mounting possibilities. Six degrees of freedom can be measured with the described arrangement.

In one modification of the described embodiments, the laser beams of the light sources L1 and L3 in the x direction have a slight divergence, by which distance measurement between the two measurement means 10 and 12 is enabled, since then the impact point depends on the distance. In this embodiment, the calibration procedure and the evaluation process must be adapted accordingly to be able to separate the distance effects from the misalignment effects. The divergence angle is chosen such that, for the intended distance measurement task, between the minimum distance $A_{min}$ and the maximum distance $A_{max}$, the detector size DX, i.e., the corresponding transverse dimension of the detector, is scanned, so that the divergence angle Div follows from the relationship:

$$Div = DX/(A_{max} - A_{min}).$$

In this invention, in addition to the good accuracy in determination of a skewed position, it is advantageous that a slight rotational misalignment of the measurement means 10 and 12 relative to one another around the axes 22, 28 and 48, 50 which are to be measured is not a barrier to exact measurement, since this can be corrected by the evaluation of all three sensors accordingly.

What is claimed is:

1. Arrangement for determining the alignment of marked axes of a first and a second body relative to one another, comprising:

a first and a second measurement means which are attachable to a respective one of the first and second bodies in a fixed spatial relation to the respective marked axis, wherein the first measurement means has a first light source for delivering a light beam, and a second and a third optoelectronic sensor, wherein the second measurement means has a second and a third source for a light beam and a first optoelectronic sensor, wherein the optoelectronic sensors being adapted to determine an impact point of a light beam thereon, and wherein the first light source is assigned to the first sensor and the second and the third light sources are assigned to the second and third sensors.

2. Arrangement as claimed in claim 1, wherein the first light source is located between the second and the third sensors, and wherein the first sensor is located between the second and third light sources.

3. Arrangement as claimed in claim 2, wherein the second and third light sources are arranged to deliver light beams that are parallel to one another.

4. Arrangement as claimed in claim 2, wherein the first, second and third light sources are arranged to produce parallel light beams when the marked axes are in parallel alignment.

5. Arrangement as claimed in claim 4, wherein the sensors have planar sensor surfaces, planes of the sensor surfaces of the second and third sensors being perpendicular to the light beam produced by the first light source, and the plane of the sensor surface of the first sensor being perpendicular to the light beam produced by the second and third light sources.

6. Arrangement as claimed in claim 2, wherein the second and the third sensors have sensor surfaces that are located on a straight line with the first light source, and wherein the first sensor has a sensor surface that is located on a straight line with the second and third light source.

7. Arrangement as claimed in claim 1, wherein the light sources are laser light sources.

8. Arrangement as claimed in claim 1, wherein each of the measurement means has means for mounting thereof on an outer peripheral surface of a respective cylindrical body such that light beams from the light sources thereof are delivered perpendicular to the respective outer peripheral surface.

9. Arrangement as claimed in claim 1, wherein each of the measurement means has means for mounting thereof on an outer peripheral surface of a respective cylindrical body such that light beams from the light sources thereof are delivered parallel to the respective outer peripheral surface.

10. Arrangement as claimed in claim 1, wherein each of the measurement means has means for mounting thereof on an outer peripheral surface of a pulley.

11. Arrangement as claimed in claim 1, wherein the second and third light source are arranged in a manner for producing light beams that are divergent to one another to enable determination of the distance between the measurement means.

12. Process for determining the alignment of marked axes of a first and a second body relative to one another, comprising the steps of:

attaching a first and a second measurement means to the first body and to the second body, respectively, in a fixed relation to the respective marked axis, producing a first light beam with a first light source of the first measurement means and delivering the first light beam to a first optoelectronic sensor provided on the second measurement means, and producing a second and a third light beam with second and third light sources of the second measurement means and delivering the second and a third light beams to a second and a third optoelectronic sensor provided on the first measurement means, and determining the impact point of the light beams on sensor surfaces of the optoelectronic sensors, and computing the relative alignment of the two measurement means from the determined impact points of the first, second and third light beams.

13. Process as claimed in claim 12, wherein, before determining the impact points of the light beams delivered by the second and third light sources, the measurement means are placed such that the light beam delivered by the first light source strikes a reference line or a reference point on the first sensor.

14. Process as claimed in claim 12, wherein the light beams are delivered perpendicular to the respective sensor surfaces.

15. Process as claimed in claim 12, wherein the light beams delivered by the second and third light sources are divergent with respect to one another, the distance between the measurement means being computed from the determined impact points of the first, second and third light beams.

* * * * *